Oct. 26, 1965    E. M. KIVIMAA    3,213,909
SAWING MACHINE

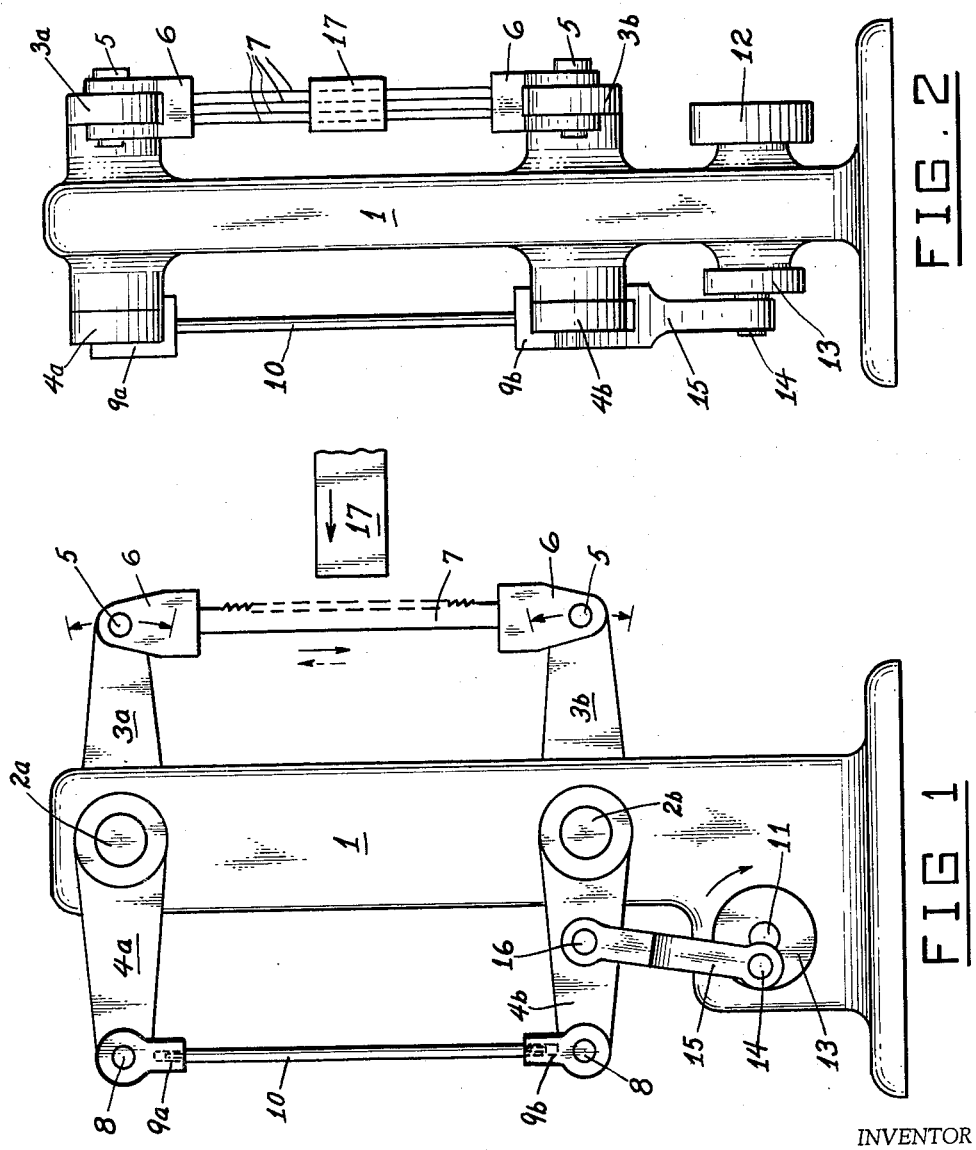

Filed Aug. 18, 1959    4 Sheets-Sheet 2

INVENTOR
EERO MIKAEL KIVIMAA

BY Herman L. Gordon
ATTORNEY

United States Patent Office 3,213,909
Patented Oct. 26, 1965

3,213,909
SAWING MACHINE
Eero Mikael Kivimaa, Linnankoskenkatu 15A,
Helsinki, Finland
Filed Aug. 18, 1959, Ser. No. 834,445
12 Claims. (Cl. 143—82)

The sawing machine described below, according to this invention, is able to perform all known types of sawing operations, but ripping of different size wood material into several lamellas is carried out particularly advantageously. Thus, the new sawing machine is specially well adapted for operations which previously have been performed by the use of frame saws, band saws, or circular saws.

One characteristic main feature of the new sawing machine is that the cutting blade or set of blades of the machine is fastened and stretched between the extreme ends of two levers in reciprocating motion. For the sake of convenience the new sawing machine is called a lever saw in the following description.

Dependent upon the purpose of operation and the size of the machine the lever saw naturally may be constructed in many different ways. Therefore attempts have been made to present only the most essential characteristics of the lever saw and illustrate the machine and its parts by entirely schematical drawings.

Figure 3:
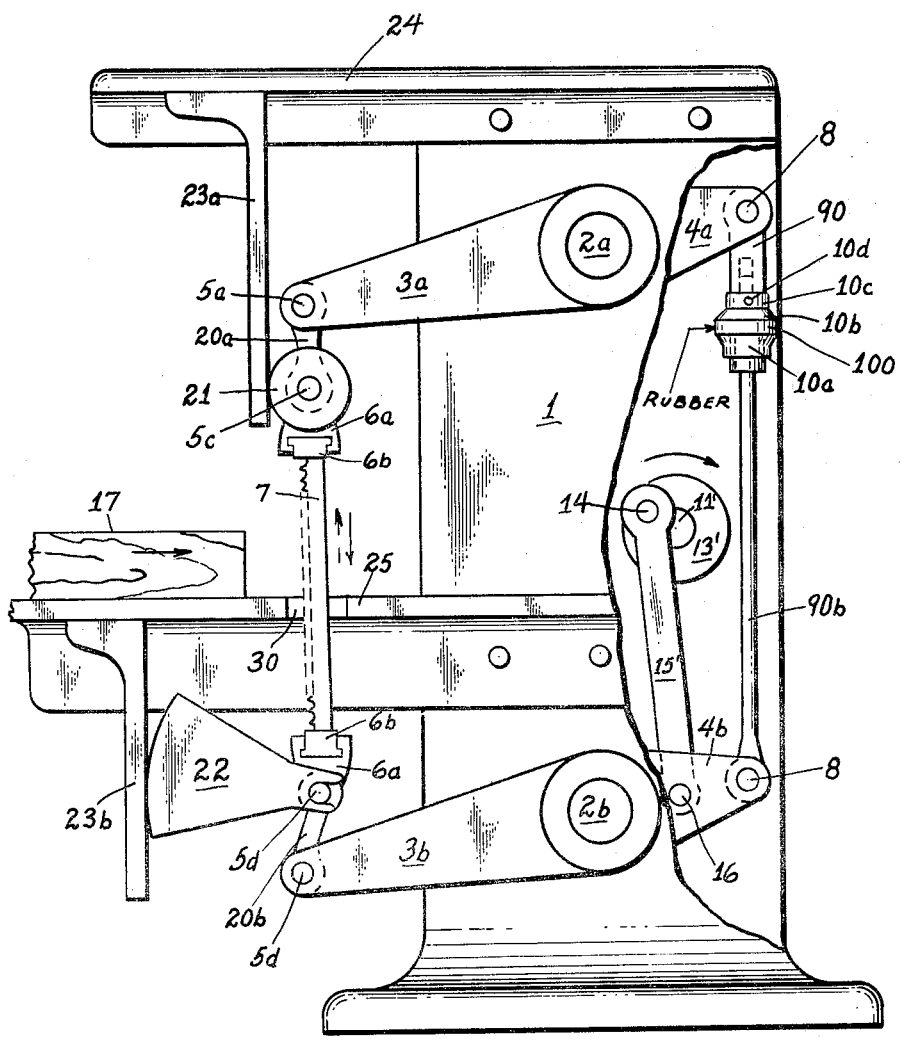
Figure 4:
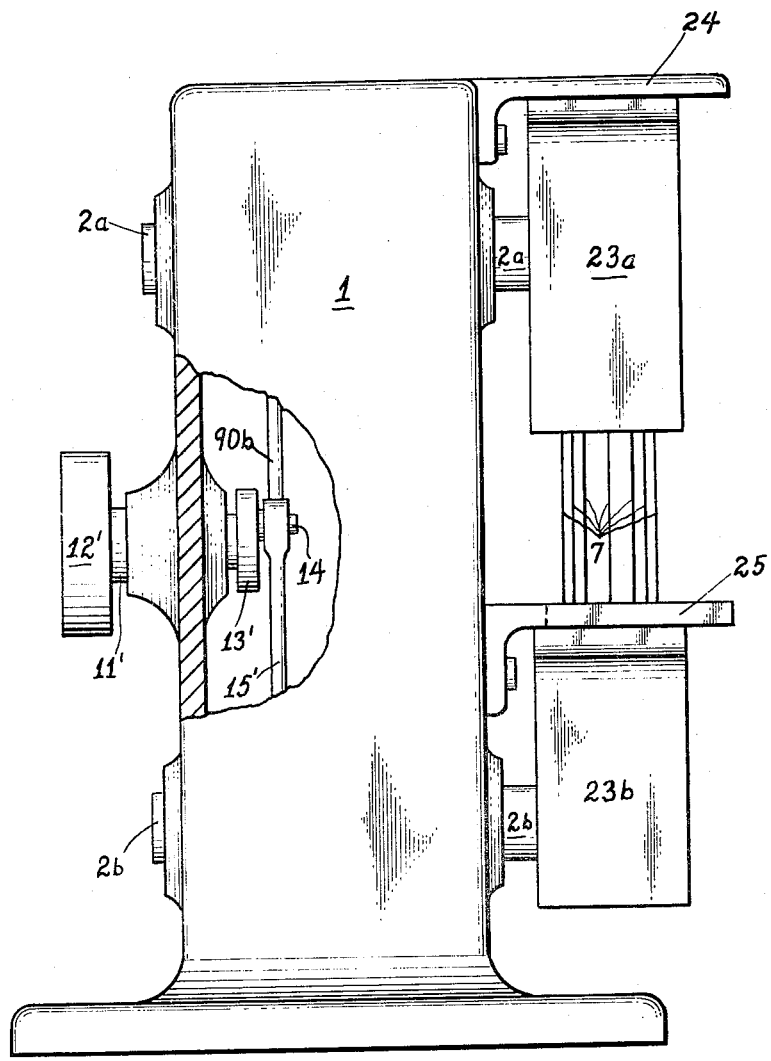
Figure 5:
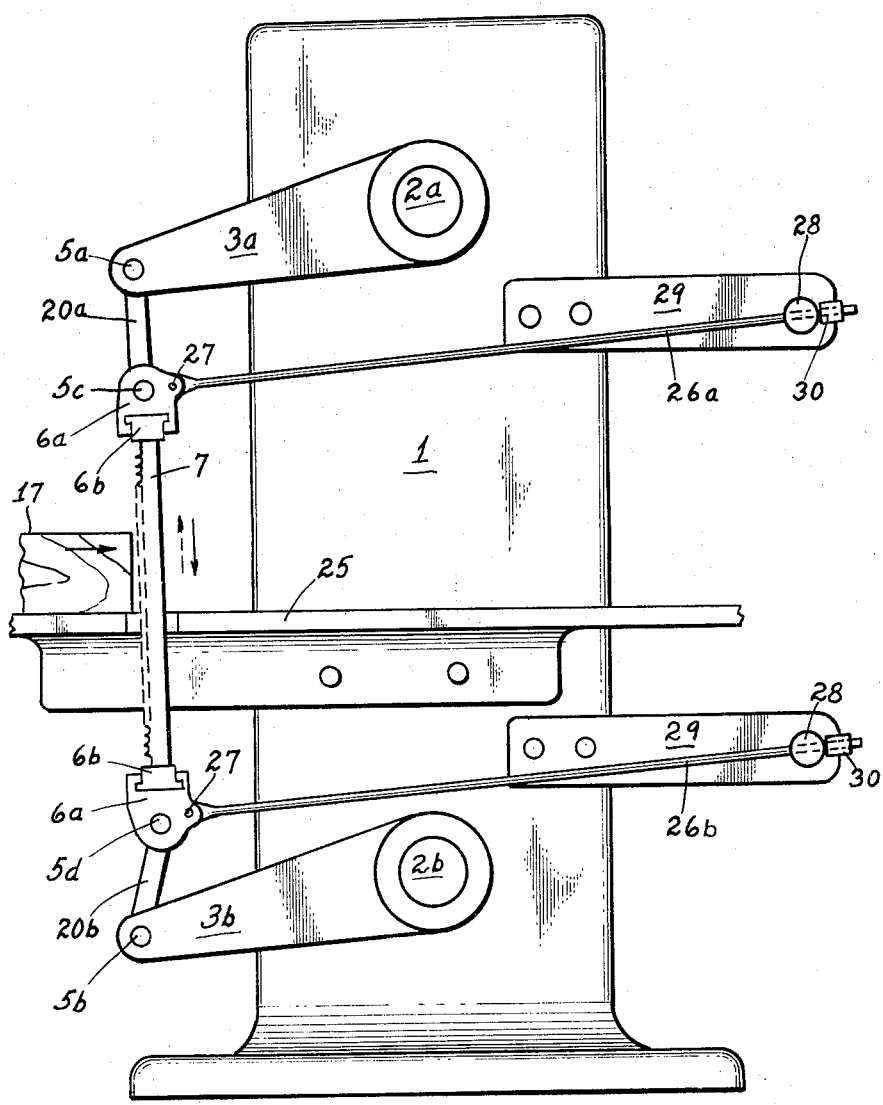

FIG. 1 presents one type of lever saw from the side and FIG. 2 from the front, or from the direction of the wood to be sawn. Correspondingly FIG. 3 shows an improved form of lever saw according to this invention from the side, and FIG. 4 the same from the front, the machine body in both figures being partially cut. FIG. 5 shows a system for guiding the blade of the lever saw seen from the side.

General construction of the lever saw

In FIGURES 1-2, presenting a lever saw of extremely simple design, 1 denotes the machine body to which two shafts 2a and 2b are connected with bearings. To one end of the shafts blade levers 3a and 3b are attached, and to the other end similar lever or arms 4a and 4b for stretching the blades. Blade holders 6, to which the blade or blades 7 are attached, are joined to the extreme ends of blade levers 3a, 3b by means of pins 5. Correspondingly, the tightening device of the blade or blades are joined to the heads of stretching levers 4a and 4b by means of pins 8, the tightening device in this case being composed of stretching blocks 9a and 9b furnished with opposite directed threads fitting on stretching rod 10. Machine body 1 is further equipped with drive shaft 11, on one end of which is mounted drive or flywheel 12 and on the other end crank wheel 13. Connecting rod 15, one end of which is joined with bearings by means of pin 16 to lower stretching lever 4b, is joined to the crank wheel by means of crank pin 14. 17 denotes the wood to be sawn and is fed in the direction towards the blades indicated by the arrow. The feeding devices of the machine are not included in the figures.

When the set of blades 7 are attached to blade levers 3a, 3b by means of blade holders 6 and pins 5, and the blades are stretched by turning stretching rod 10, the machine may be started bringing the blade and stretching levers into reciprocating motion, whereupon the blades move up and down. Due to the construction of the machine the blades on approaching the upper as well as the lower dead centre move a little backwards, which from a cutting pont of view in certain instances may be even more advantageous than a linear motion.

The first successful experiments with the lever saw have been actually carried out with a device of the type just described. The further developed lever saw presented in FIGURES 3-4 differs as to its general construction primarily in the following respects. The cross-section of body 1 of the lever saw is made U-shaped and main shafts 2a and 2b are mounted firmly on this at two points with bearing connection. Drive shaft 11' of the machine is located between main shafts 2a and 2b and is mounted on the side of the body. By this arrangement the body of the machine will be quite low and firm. Pulley 12' of the machine may at the same time act as flywheel, while crank wheel 13' located inside of the body may be furnished with suitable counter weights to balance running. Also connecting rod 15', obtaining its motion from crank pin 14 and being connected to the lower stretching lever or arm 4b by means of pin 16, is located entirely inside the body. Further inside the body and protected by it are located stretching levers 4a and 4b attached to main shafts 2a and 2b, as well as stretching devices 90–90b connected to same by pins 8. In order to reduce the body forces of the moving parts the length of stretching levers 4a and 4b, is chosen considerably shorter than that of blade levers or arms 3a and 3b joined to the main shafts. The location of connecting rod 15' close to main shaft 2b also decreases the inertia of the moving parts. Due to these steps as well as a suitable design of the moving parts and selection of raw material a very high number of strokes may be obtained by the lever saw.

Guiding arrangements for the blades

It was already mentioned above that the blades are brought into reciprocating curvilinear motion, if blade holders 6 are joined directly to the ends of blade levers 3a, 3b (FIGS. 1 and 2). In such cases where symmetrical teeth cutting in both directions may be used, as in cross-cut sawing and sometimes also in rip sawing, this is usually of no disadvantage because then both blade strokes operate as working strokes. However, teeth cutting in only one direction is generally used in rip sawing. In connection with continuous feeding and relatively heavy pieces to be sawn the tooth backs would then be scraping against the bottom of the kerf, which would tend to produce great strain on the blade. In order to avoid this the blade may be given a suitable forward inclination or overhang the way this is done in frame sawing. It is also possible to place between the blade holder and the blade levers extension arms, 20a, 20b shown in FIGS. 3 and 5. Even a relatively small force on the blades directed from the front will then suffice to press the blades somewhat back, when moving upwards without essentially changing the strain of the blades. Overhang and extension arms may be applied either separately or in combination.

Still better results will be had if the blades are suitably controlled either from the blade holders 6a or pins 5c and 5d of the blade holder and extension arms 20a, 20b. Then the course of motion of the blades could be changed to be either less curved, straight-lined, or to any shape whatsoever. Furthermore, the blades may be given a reciprocating motion synchronized with the principal motion of the blades and perpendicular to same by means of the guiding devices such, that the teeth will cut a chip of approximately even thickness during the entire working stroke, also when continuous feeding is applied.

One guiding arrangement of the blades that has proved suitable is shown in FIG. 3 at upper blade lever 3a. One or two e.g. rubber covered guide wheels 21 bearing and rolling on guide plate 23a are mounted on shaft pin 5c joining blade holder 6a and extension arm 20a. Guide plate 23a in turn is joined to upper table 24 of the lever saw for easy mounting, the upper table being fixed to body 1 of the machine. The arrangement for guiding the lower end of the blades differs from the previous one in that guide wheel 21 is replaced by a guide sector of a larger diameter wheel, or the like 22, which is kept in position relative to guide plate 23b in a suitable manner not presented in the drawing. Guide plate 23b in turn is secured to feed table 25 of the lever saw. Guide plates 23a and 23b will give the blades the overhang desired. Further, either one of the guide plates, for instance 23b, may be connected with the feeding speed controls of the lever saw, so that the blade overhang automatically changes on changing the feeding speed of the wood to be sawn. Also, it is possible to provide guide plates 23a and 23b with the abovementioned reciprocating horizontal motion synchronized with the motion of the blades, thus enabling the teeth to cut a chip of even thickness.

FIG. 5 presents still another guiding arrangement of the blades based upon the use of guide rods 26a and 26b which are much longer than the blade levers. The guide rods are attached to blade holders 6a by means of pins 27, the opposite ends going through shafts 28 on supporting bars 29. By means of nuts 30 regulating the length of the guide rods the blades are drawn a little backwards from the position they would otherwise have when stretched between blade levers 3a and 3b. The course of motion of the blades will be somewhat curved, but otherwise the possibilities of regulating the blade overhang and the pulsating motion are the same as above.

In all guiding arrangements of the blades described here, the motion of the blades may be controlled in such a way that, although the course of motion of the blades is determined, the blades are still able to give way backwards from said course due to forces possibly affecting them from the front and exceeding a given limit. The blades thus cannot under any conditions become subject to great strains of the kind, for instance, the blades of a frame saw undergo, when the up-stroke of the blades is setting in. This is partly the reason why quite thin blades may be used in the lever saw, and the required tension on the blades is only a fraction of the corresponding tension on the blades of a frame saw.

*Flexible stretching of the blades*

The guiding arrangements of the blades described involve the use of flexible stretching devices, so that the tension of the blades does not undergo unnecessary variation during the stroke. For instance, the solution presented in FIG. 3 has turned out in practice to be quite advantageous. The upper end of lower stretching arm 90b is fitted to glide inside the hollow lower end of the upper stretching arm 90, which end is further provided with an oval hole for pin 10d which fixes ring 10c to lower stretching arm 90b. Stretching flange 10b rests against said ring. A second stretching flange 10a is attached to upper stretching arm 90 by means of threads. The actual flexible member is located between the two flanges, e.g. is a rubber cushion 100 of a suitable thickness. The desired tension of the blades is obtained by turning stretching flange 10a.

Though the flexible stretching of the blades just described has turned out to serve its purpose, this may be accomplished on the lever saw in several other ways too. Thus, stretching devices 90–90b may be replaced by a fixed connecting member between levers 4a and 4b, and the flexible device put onto either one (or both) blade holder extensions 20a, 20b, or blade lever 3a or 3b itself. According to examinations carried out such a method appears particularly advantageous, where flexible coupling is used between blade levers 3a, 3b or stretching levers 4a, 4b and main shafts 2a, 2b of the machine. Then, the blades will not cause a movement of the body forces of the moving parts, and the mass of the stretching devices will be concentrated near the main shafts, thus giving rise only to a small increase in moment of inertia. Furthermore, a flexible coupling moderates the force peaks of the moving parts originating from the crank motion and makes a further increase of the r.p.m. of the machine possible. The last described flexible stretching arrangements call for a separate stretching device for the blades as well as stretching controls. Such control may be accomplished e.g. by a two-way screw on the connecting member of the stretching levers or the extension arm of the blade holder, an eccentric on some joint, or the desired blade tension may be obtained by adjusting the distance between the case-like blade holders 6a and 6b in making the blade set, the blade holders being separated by the correct distance by some auxiliary device on changing the blade set.

*Feeding equipment of the lever saw*

The simplest feeding system of the lever saw is hand feeding. Only a feed table 25 mounted on machine body 1 as shown in FIGS. 3–5 is necessary, the table being provided with a suitable cut 30 for the blade set and its positioning from the side. When pieces having rectangular cross-section are to be sawn the table may be provided with adjustable guide supports for one or both sides of the piece to be sawn. It is also practical to apply one or several pressing devices to support light pieces from above. A glide shoe or adjustable roller, or one provided with a spring may serve as such a pressing device. A device consisting of a lever and a weight has proved to be particularly suitable. If the piece to be sawn is relatively heavy and the number of strokes of the machine is high, there is no need for pressing devices.

The lever saw provided with a table is made machine-fed by using machine-drawn rollers pushing the wood from above or below, or from the side. Mechanical feeding may also be accomplished by means of a chain provided with suitable grasps. A feed mat or belt, machine-drawn and built into the table of the saw, upon which the pieces to be sawn are placed constitutes a particularly suitable feeding system for the lever saw. If necessary, the above-mentioned pressing devices and guides may be used, and the machine may be furnished with a separate feed mat operating in front of the blade set as well as behind it.

*Other modes of performance and applications of the lever saw*

The invention is not restricted to the examples described above alone, but it may vary within the scope of the patent claims in multiple ways. For instance, instead of having one group of blades and one pair of blade levers on the same machine and the same pair of shafts, several blade sets may be fitted for sawing either in the same direction, or in opposite directions, from different sides of the machine. Blade levers located on different sides may be made in one piece too, and may be extensions of each other, if the saw is used for the treatment of very short pieces of material. Therefore, it might be the appropriate thing to replace the stretching device of the blade presented in FIGS. 1–5 by a rigid connecting member and accomplish stretching of each blade set by some other means, e.g. by a suitable extension arm of the blade holder for each blade set separately. Instead of one blade set, or several blade sets, also single blades may be used in the machine, and this may equally well be used for cross-cut sawing of the wood, and for sawing any material whatsoever. Furthermore, the blades in the machine can be just as well horizontal as vertical. In the above examples the connecting rod was joined to the stretching lever, but the machine may also be provided with a separate crank. The connecting rod, or corresponding drive member of the machine, may be joined to some blade lever 3a or 3b, or to a connecting bar forming part of the stretching device.

Advantages of the lever saw

Though, the advantages of the lever saw already have been partly presented above, it may be repeated that very thin blades can be used in the lever saw, which means a low waste in raw-material and an easy expedient exchange of blades. The mass of the moving parts of the machine in the region of the blades is extremely small, because the main part of the mass of the moving parts is put on main shafts $2a$ and $2b$, or close to these, where its velocity and influence on the blade-adjoining mass is small. On this account the machine according to the invention will be light and cheap. Also, it is evident that the lever saw is an efficient substitute for the frame saw, which in many instances has proved to be troublesome. Furthermore, it may be adapted for a number of purposes where the circular saw or the band saw have been applied previously—particularly in those cases where a small raw-material loss, a great exactness of measurement, and a good sawing surface are important. Due to its simple design the lever saw may be easily employed as a high-speed, high-powered production machine, on one hand, and on the other hand as a cheap, but still accurately operating saw for home use.

I claim:

1. In a sawing machine of the character described, a support, a pair of lever members pivoted to the support on spaced parallel axes, said lever member each being provided with a saw blade supporting arm extending in one direction from its pivotal axis and a tensioning arm extending in an opposite direction from its pivotal axis, means connecting the tensioning arms, a saw blade located in a cutting plane perpendicular to said parallel axes, respective blade holders connected to the opposite ends of the saw blade, rigid link means swingably connecting said blade holders to the respective saw blade supporting arms, and motion-constraining means pivotally connected to at least one of said blade holders and engaging said support to guide the movement of the last-named blade holder as the lever members oscillate, said motion-constraining means being oscillated responsive to the oscillation of the lever members.

2. In a sawing machine of the character described, a support, a pair of lever members pivoted to the support on spaced parallel axes, said lever members each being provided with a saw blade supporting arm extending in one direction from its pivotal axis and a tensioning arm extending in an opposite direction from its pivotal axis, means connecting the tensioning arms, a saw blade located in a cutting plane perpendicular to said parallel axes, respective blade holders connected to the opposite ends of the saw blade, respective rigid extension arms swingably connecting said blade holders to the respective saw blade supporting arms, and motion-constraining means pivotally connected to at least one of said blade holders and engaging the support to guide the movement of said last-named blade holder as the lever members oscillate, said motion constraining means being oscillated in a plane parallel to the plane of oscillation of the lever members responsive to the oscillation of said lever members.

3. In a sawing machine of the character described, a support, a pair of spaced lever members pivoted to the support on parallel axes, said lever members each being provided with a saw blade supporting arm extending in one direction from its pivotal axis and with a tensioning arm extending in an opposite direction from its pivotal axis, a tensioning member connecting said tensioning arms, respective blade holders, means connecting said blade holders to the saw blade supporting arms, said connecting means including at least one rigid extension arm pivoted to one of the supporting arms, a saw blade located in a cutting plane perpendicular to said parallel axes and connected at its ends to said blade holders, a control member connected to said support, means to oscillate the lever members, and motion-constraining means pivotally connected to the extension arm and engaging and cooperating with said control member to guide the movement of the saw blade as the lever members oscillate, said motion-constraining means being oscillated responsive to the oscillation of the lever members, said tensioning member acting to simultaneously impose tension on said extension arm and said saw blade.

4. The structure of claim 3, and wherein the tensioning arms are substantially shorter than the saw blade supporting arms.

5. In a sawing machine of the character described, a support, a pair of spaced lever members pivoted to the support on parallel axes, said lever members each being provided with a saw blade supporting arm extending in one direction from its pivotal axis and with a tensioning arm extending in an opposite direction from its pivotal axis, a tensioning member connecting said tensioning arms, respective blade holders, a saw blade located in a cutting plane perpendicular to said parallel axes and connected at its ends to said blade holders, respective rigid extension arms connected to said blade holders and piovtally connected to the saw blade supporting arms, a pair of control members connected to the support, means to oscillate said lever member, and respective motion-constraining members pivotally connected to the extension arms and engaging and cooperating with the control members to guide the movement of the blade holders as the lever members oscillate, said motion constraining members being oscillated responsive to the oscillation of the lever members, said tensioning member acting to simultaneously impose tension on said extension arms and said saw blade.

6. In a sawing machine of the character described, a support, a pair of spaced lever member pivoted to the support on parallel axes, said lever members each being provided with a saw blade supporting arm extending in one direction from its pivotal axis and with a tensioning arm extending in an opposite direction from its pvotal axis, a tensioning member connecting said tensioning arms, said tensioning member being provided with a yieldable portion, respective blade holders, a saw blade located in a cutting plane perpendicular to said parallel axes and connected at its ends to said blade holders, means connecting said blade holders to the saw blade supporting arms, said connecting means including at least one rigid extension arm pivoted to one of the supporting arms, a control member connected to said support, means to oscillate the lever members, and motion-constraining means pivotally connected to the extension arm and cooperatively engaged with said control member to guide the saw blade as the lever members oscillate, said motion-constraining means being oscillated responsive to oscillation of the lever members, said tensioning member acting to simultaneously impose tension on said extension arm and the saw blade.

7. In a sawing machine of the character described, a support, a pair of lever member pivoted to the support on spaced parallel axes, said lever members each being provided with a saw blade supporting arm extending in one direction from its pivotal axis and with a tensioning arm extending in an opposite direction from its pivotal axis, a tensioning member connecting said tensioning arms, a saw blade located in a cutting plane perpendicular to said parallel axes, respective blade holders connected to the opposite ends of the saw blade, respective rigid extension arms swingably connecting said blade holders to the respective saw blade supporting arms, means to oscillate the lever members, control means on the support, and motion-constraining means pivotally connected to the extension arms and cooperatively engaged with said control means to guide the saw blade as the lever members oscillate, said motion-constraining means being oscillated responsive to oscillation of the lever members, said tensioning member acting to simultaneously impose tension on said extension arms and the saw blade.

8. The structure of claim 7, and wherein said motion-constraining means comprises respective guide members connected to the blade holders and having arcuate peripheral surfaces, and said control means comprises respective straight guide plates mounted in parallel relation on the support and engaged by said arcuate peripheral surfaces.

9. The structure of claim 8, and wherein one of said guide members is a rotatable wheel and the other guide member is a sector of a larger diameter wheel.

10. The structure of claim 7, and wherein said motion-constraining means comprises guide rods connected between portions of the blade holders and the control means.

11. The structure of claim 10, and wherein said control means comprises a pair of spaced supporting bars secured to said support and provided with shafts receiving the guide rods.

12. The structure of claim 11, and wherein nuts are provided on the guide rods engageable with said shafts to adjust the effective lengths of the guide rods.

References Cited by the Examiner
UNITED STATES PATENTS

|  | 12/28 | Thompson | 143—81 |
|---|---|---|---|
| 16,416 | 1/57 | Whipple | 143—82 |
| 16,435 | 1/57 | Gregg | 143—82 |
| A.I.218 | 2/59 | Whipple | 143—82 |
| 23,355 | 3/59 | Crittendon | 143—82 |
| 59,200 | 10/66 | Ewing | 143—82 |
| 510,962 | 12/93 | Deuther | 143—156 |
| 555,037 | 2/96 | Dees. | |

FOREIGN PATENTS

| 184,361 | 1/56 | Austria. |
| 609,495 | 2/35 | Germany. |
| 378,019 | 7/32 | Great Britain. |
| 628,094 | 8/49 | Great Britain. |

WILLIAM W. DYER, Jr., *Primary Examiner.*

MORRIS M. FRITZ, WALTER A. SCHEEL, DONALD R. SCHRAN, *Examiners.*